UNITED STATES PATENT OFFICE.

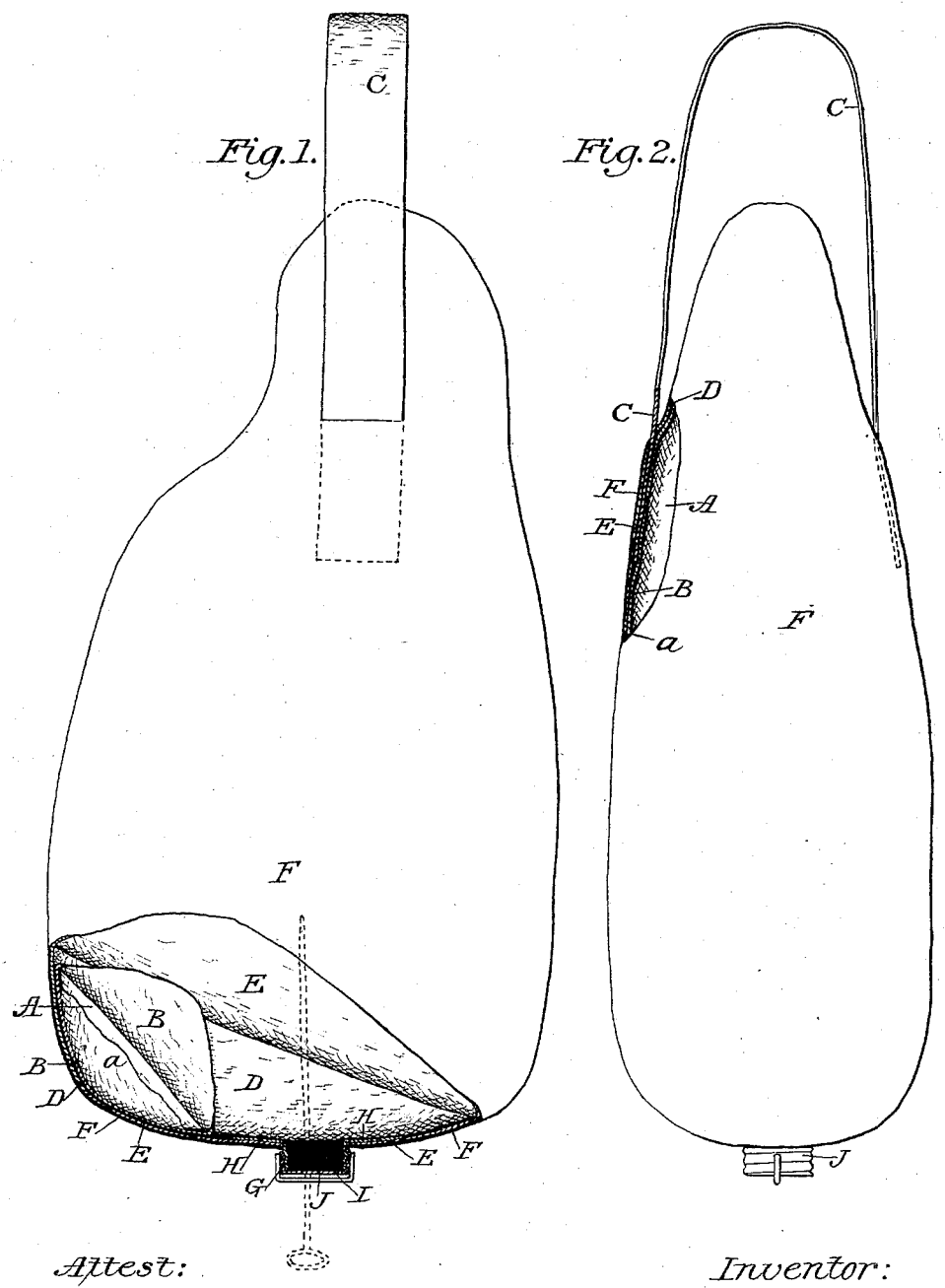

JAMES W. CAMERON, OF NEW YORK, N. Y.

PRESERVING ANIMAL FOOD.

SPECIFICATION forming part of Letters Patent No. 473,893, dated April 26, 1892.

Application filed September 26, 1890. Serial No. 366,254. (No model.)

*To all whom it may concern:*

Be it known that I, JAMES W. CAMERON, of the city, county, and State of New York, have invented a new and useful Improvement in the Preservation of Cured Hams, Fish, and other Articles of Animal Food; and I do hereby declare that the following is a full and exact description thereof, reference being had to the accompanying drawings, and to the letters of reference marked thereon, making a part of this specification.

My invention relates to the protection of cured meats or fish from deterioration by reason of changes of climate or of temperature and from the attacks of insects and vermin.

It has for its object to so envelop the prepared article as that it shall not be subject to the influence of heat or cold and shall be impervious to moisture and proof against insects and vermin. This object is attained by coating the preserved article in manner, substantially as hereinafter described, with one or more layers of a compound of varnish combined with a material which is a good non-conductor of heat and in providing the same with an opening protected by a nozzle and cap containing a plastic composition to permit of the insertion of a trying-blade to test the condition of the meat; and my invention is applicable to the complete preservation of ham, bacon, smoked fish, or any other article of animal food which has already been smoked, salted, dried, or otherwise properly cured, to prevent organic decay, and to enable it to resist the destructive effects thereon of ordinary climatic influences.

The accompanying drawings represent a smoked ham hermetically sealed in an inclosing case in accordance with my invention, Figure 1 being a side elevation, and Fig. 2 an end elevation thereof, partly in section.

In carrying out my invention, the ham A or other meat is first coated or enveloped with lime, as at *a*, Fig. 1, applied thereto in the form of a paste made of quicklime and water and reduced to a consistency which will allow of its application to the surface of the article, either by means of a brush as a paint or in a semi-fluid condition, which will permit the article to be coated by repeated dippings therein. After being thus coated with lime the article A is then carefully and tightly sewed up in a wrapper or envelope B of paper-pulp or cotton-goods or other textile fabric, to one end of which is attached, exteriorly, a strap or handle C, (see Fig. 2,) by means whereof it may thereafter be taken up or suspended. As this strap C is outside of the fibrous or textile envelope B, any moisture which may possibly follow the handle to its point of attachment will still be prevented from reaching the inclosed meat A by reason of the intervening envelopes. This first fibrous or textile wrapper B is then coated with a compound composed of a small quantity of powdered chalk, talc, calcined gypsum, or other equivalent earthen or mineral substance admixed with a varnish consisting of a gum-resin—such as shellac, gum-copal, or other equivalent water-repelling gum—dissolved in alcohol or other well-known solvent in manner as is well known to the art and which need not herein be described. After the first coat D of varnish has been allowed to dry, a second, and in some cases a third may be applied in order to obtain a sufficiently thick air-tight moisture-proof casing about the article with the underlying fabric B as its base. A coating is next applied of a similar gum varnish, which has been further thickened with powdered chalk, talc, or other equivalent substance which is a good non-conductor of heat, the proportion of the powder to the varnish being about one or two pounds of chalk or its equivalent to twelve pounds of thin varnish, and while this compound of varnish or chalk is still wet the coated article is next wrapped and sewed up in a second outer envelope E of suitable textile fabric, which will be made to adhere firmly and closely to the entire surface thereof by means of the varnish acting as a cement therefor. Finally, when this outer cemented fibrous or textile envelope E is dry and hard one or more coatings F of the compound of varnish and chalk are applied, imparting a beautiful pure-white clean finish to the article. A piece of cured meat thus coated will be hermetically sealed and be absolutely protected by the non-conducting properties of the chalk or its equivalent against the excessive heat of tropical regions and will resist effectually the insects which penetrate all ordinary coverings, so that hams and similar articles thus coated may be shipped to and stored in any part of the globe without loss or deterioration until it is desired to use them. The second fibrous or textile wrapper E serves to protect all the underlying coatings even should the outer coating or facing F be broken or chipped off, and said outer coating by virtue of the chalk entering into its composition not only protects all that underlies it, but produces a neat hard clean resistant surface thereon.

It will be observed that an essential element of the coating is the powdered chalk, talc, kaolin, or other material of a similar nature, and I am aware that such materials have been used for similar purposes as a paste mixed with water or vinegar and allowed to dry. The difficulty which has been met with heretofore, however, has been that the coating thus formed has been brittle and in handling the articles the coating chips off or cracks sufficiently to admit air. I have overcome this difficulty by mixing the earthy powder with varnish, which imparts to the coating a degree of flexibility and toughness sufficient to withstand rough handling.

In order to permit of an examination as to the condition of the incased meat by the insertion therein of a testing blade or needle without impairing the efficiency of the hermetical casing, a threaded metallic nozzle G may be secured by means of a flange H, encircling the base of the nozzle to the first or inner textile wrapper B, as illustrated in the drawings. The successive coatings D and F of varnish and the outer textile wrapper E are then made to overlap the flange of the nozzle, so as to render its joint with the envelope hermetically tight. The nozzle thus made virtually integral with the coating is designed to be filled with a composition I of beeswax and rosin or other equivalent plastic sealing composition which is soft enough to admit of the ready passage of a metallic blade K (see dotted lines, Fig. 1) through it and which after the withdrawal of the blade may be pressed back with the finger to close the aperture formed therein by the tool, and it is closed by means of a stopper either in the form of a plug J, screwing therein, as illustrated in the drawings, or by a cap made to screw thereon as an equivalent device.

I claim as my invention—

1. The within-described water-proof air-tight envelope for animal food, consisting of a coating of lime applied to the article, a wrapper of fabric outside of said coating of lime, a coating of varnish mixed with an earthy powder, said coating being allowed to dry, a second coating of a similar compound, an envelope of fabric caused to adhere to said second coating by application thereto while the latter is soft, and an outer coating of a similar compound, substantially as shown and described.

2. The combination, with a water-proof air-tight envelope of textile fabric closely wrapped about a piece of animal food, of a nozzle fitted to said envelope with a hermetically-sealed joint and a detachable stopper closing said nozzle, substantially in the manner and for the purpose herein set forth.

3. The combination, with a water-proof air-tight envelope closely wrapped about a piece of animal food, of a nozzle fitted to said envelope with a hermetically-sealed joint, plastic compound sealing said nozzle, and a cup or stopper closing the nozzle and protecting the compound, substantially in the manner and for the purpose herein set forth.

In testimony whereof I have signed my name to this specification in the presence of two subscribing witnesses.

JAMES W. CAMERON.

Witnesses:
A. N. JESBERA,
E. M. WATSON.